United States Patent
Pajona et al.

(10) Patent No.: US 11,736,154 B2
(45) Date of Patent: Aug. 22, 2023

(54) METHOD AND SYSTEM FOR CONTROLLING AN ANTENNA ARRAY

(71) Applicant: Kyocera AVX Components (San Diego), Inc., San Diego, CA (US)

(72) Inventors: Olivier Pajona, Antibes (FR); Laurent Desclos, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 50 days.

(21) Appl. No.: 17/238,489

(22) Filed: Apr. 23, 2021

(65) Prior Publication Data
US 2021/0344383 A1 Nov. 4, 2021

Related U.S. Application Data

(60) Provisional application No. 63/017,938, filed on Apr. 30, 2020.

(51) Int. Cl.
| | |
|---|---|
| *H04B 7/0404* | (2017.01) |
| *G16Y 10/75* | (2020.01) |
| *H04B 7/0413* | (2017.01) |
| *H01Q 3/34* | (2006.01) |
| *H04L 27/04* | (2006.01) |

(52) U.S. Cl.
CPC ............ *H04B 7/0404* (2013.01); *G16Y 10/75* (2020.01); *H01Q 3/34* (2013.01); *H04B 7/0413* (2013.01); *H04L 27/04* (2013.01)

(58) Field of Classification Search
CPC .. H04B 7/0404; H04B 7/0413; H04B 7/0689; G16Y 10/75; H01Q 3/34; H01Q 21/28; H01Q 5/378; H04L 27/04; H04L 5/0023; H04L 5/0053
USPC .............................................. 375/219; 455/95
See application file for complete search history.

(56) References Cited

U.S. PATENT DOCUMENTS

| | | |
|---|---|---|
| 6,765,536 B2 | 7/2004 | Phillips et al. |
| 6,774,863 B2 | 8/2004 | Shirosaka et al. |
| 6,987,493 B2 | 1/2006 | Chen |
| 7,068,234 B2 | 6/2006 | Sievenpiper |

(Continued)

OTHER PUBLICATIONS

International Search Report and Written Opinion for PCT/US2021/028793, dated Aug. 12, 2021, 11 pages.

*Primary Examiner* — Don N Vo
(74) *Attorney, Agent, or Firm* — Dority & Manning, P.A.

(57) ABSTRACT

An antenna system can include an antenna array having a plurality of antenna elements. The antenna system can include an array controller configured to control operation of the antenna array for beam forming of the antenna array. The antenna system can include a radiofrequency circuit. The antenna system can include a transmission line coupling the radiofrequency circuit to the array controller. The transmission line can be configured to carry a radio-frequency signal to the antenna array. The radiofrequency circuit can be configured to modulate an antenna array control signal onto the radiofrequency signal to generate a transmit signal for communication over the transmission line to the array controller. The array controller can be configured to demodulate the antenna array control signal from the transmit signal such that the array controller is configured to control operation of the antenna array based at least in part on the antenna array control signal.

18 Claims, 6 Drawing Sheets

(56) References Cited

U.S. PATENT DOCUMENTS

| | | |
|---|---|---|
| 7,215,289 B2 | 5/2007 | Harano |
| 7,830,320 B2 | 11/2010 | Shamblin |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Desclos et al. |
| 9,755,580 B2 | 9/2017 | Desclos et al. |
| 10,574,447 B2 | 2/2020 | Djordjevic et al. |
| 2012/0229307 A1* | 9/2012 | Tsai ...................... G06F 3/0231 375/300 |
| 2014/0133525 A1* | 5/2014 | Desclos ................... H04B 1/40 375/238 |
| 2016/0335857 A1* | 11/2016 | Wedig ...................... H04B 1/38 |
| 2019/0267708 A1 | 8/2019 | Tennant et al. |
| 2019/0394072 A1* | 12/2019 | Roe ......................... H04L 27/04 |
| 2020/0091608 A1 | 3/2020 | Alpman et al. |

\* cited by examiner

METHOD AND SYSTEM FOR CONTROLLING AN ANTENNA ARRAY

PRIORITY CLAIM

The present application claims the benefit of priority of U.S. Provisional App. No. 63/017,938, titled "Method and System for Controlling an Antenna Array," having a filing date of Apr. 30, 2020, which is incorporated by reference herein.

FIELD

The present disclosure relates generally to antenna systems for wireless communication systems, such as antenna systems for use in 5G cellular communication systems.

BACKGROUND

Electronic devices such as laptops, tablets, smartphones, IoT (Internet of Things) devices, etc. can be operable to communicate over cellular networks. Cellular networks operating at 4G are in abundant use and have recently evolved to provide moderate to high data-rate transmissions along with voice communications in a stable and reliable network over large regions. Communication systems are transitioning to 5G protocol and networks. 5G networks can provide substantially higher data-rates and lower latency, and can be applicable for voice, data, and IoT applications.

SUMMARY

Aspects and advantages of embodiments of the present disclosure will be set forth in part in the following description, or may be learned from the description, or may be learned through practice of the embodiments.

One example aspect of the present disclosure is directed to an antenna system. The antenna system can include an antenna array comprising a plurality of antenna elements. The antenna system can include an array controller configured to control operation of the antenna array for beam forming of the antenna array. The antenna system can include a radiofrequency circuit. The antenna system can include a transmission line coupling the radiofrequency circuit to the array controller. The transmission line can be configured to carry a radiofrequency signal for communication via the antenna array. The radiofrequency circuit can be configured to modulate an antenna array control signal onto the radiofrequency signal to generate a transmit signal for communication over the transmission line to the array controller. The array controller can be configured to demodulate the antenna array control signal from the transmit signal such that the array controller is configured to control operation of the antenna array based at least in part on the antenna array control signal.

Another example aspect of the present disclosure is directed to a method for operating an antenna system including an antenna array. The method can include modulating an antenna array control signal onto a radiofrequency signal to generate a transmit signal. The method can include communicating the transmit signal to an array controller via a transmission line. The method can include demodulating the antenna array control signal at the array controller. The method can include controlling operation of the antenna array based at least in part on the antenna array control signal.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
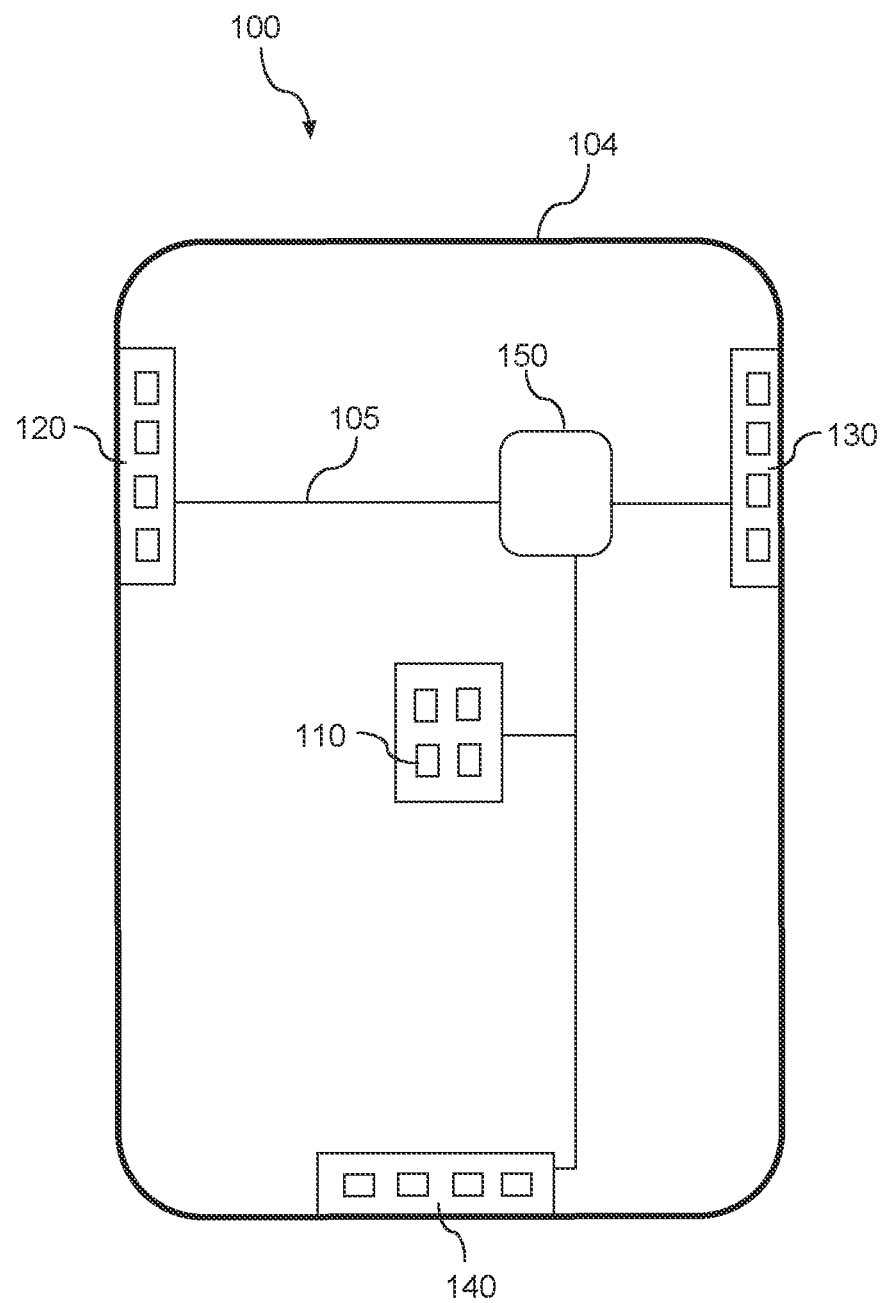
FIG. 1 depicts a mobile device having an antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for beam forming using one or more antenna array(s) in communication systems, such as 5G communication systems. For instance, an antenna system for a device can include one or more antenna array(s). Each antenna array can have a plurality of different antenna elements. The antenna elements can be configured (e.g., by controlling a phase and/or amplitude of each antenna element) to control operation of the antenna array(s) for beam forming.

5G communication protocols can be implemented, for instance, using antenna arrays that are configured for communication at higher frequency bands (e.g., a frequency band in the range of about 24 GHz to about 86 GHz) and/or MIMO communications. Each of these antenna arrays can include a plurality of antenna elements. For instance, in some cases, the antenna elements can be individually and/or collectively controlled to communicate signals (e.g., radiofrequency signals) in a MIMO mode (e.g., a 4×4 MIMO mode). These and other suitable 5G features can provide for higher data-rates and lower latency in wireless communications.

An electronic device (e.g., a mobile device, IoT device, or other electronic device) can include a plurality of antenna arrays (e.g., two antenna arrays, three antenna arrays, four antenna arrays). For example, a mobile device can be a device such as a smartphone, tablet computer, etc. that is capable of being held (e.g., entirely held) in a user's hand while in operation. According to example aspects of the present disclosure, a plurality of antenna elements of an antenna array can be controlled to support beamforming at the antenna array. Beam forming refers to the combination of different antenna beams to increase the signal strength in a particular direction (e.g., the direction of a base station) to enhance communication links. As one example, phase and/or amplitude of each of the plurality of antenna elements in one or more antenna arrays can be configured to produce a radiation pattern (e.g., in a beam forming process).

Signals communicated to and/or received from the antenna array(s) (e.g., control signals) can be communicated to and/or from a central processor (e.g., a baseband processor and/or host CPU) in a mobile device. Transmitting control signals within the mobile device (e.g., between the central processor and antenna array(s)) can present challenges with RF communications. For instance, the use of antenna arrays having a plurality of antenna elements can require an increased amount of signal resources (e.g., control signal lines, wiring, etc.) to control and/or otherwise utilize the antenna arrays. As one example, the antenna elements must be controlled to perform a beam forming and/or beam steering process for transmission. For instance, in some cases each of the antenna elements in an antenna array can require one or more unique control signal lines (e.g., in a bus) to operate. These increased signal resources can contribute to an increased space dedicated to control signal lines.

Additionally and/or alternatively, control signal lines within the mobile device configured to transmit the signals can experience electrical interference, such as capacitive coupling between two or more control signal lines. The increased size of antenna arrays can reduce available space for providing control signal lines such that the signal lines are decoupled, which can present challenges with mitigating interference. This can especially be problematic if it desirable to provide the antenna array in a mobile device having limited available space, such as, for example, a smartphone. Additionally, in some cases, the signal lines can interfere with digital controls, such as control of switches, phase shifters, etc. Furthermore, routing and/or debugging an increased amount of transmission lines in a mobile device can present increased design costs. These problems can be especially apparent as the number and/or width (e.g., of busses) of signal lines continues to grow with the advent of 5G communication technologies.

To solve these and other problems, control signals for an antenna array can be transmitted by a transmission line, such as a coaxial cable, by modulating the control signals for the antenna array onto a radiofrequency signal. This can provide for a reduction in the number of wires necessary to transmit the control signal and the radiofrequency signal. For instance, a single coaxial cable can be used to transmit a transmit signal that includes the radiofrequency signal and modulated control signals.

Additionally, in some embodiments, DC power for operation of an antenna array can be transmitted to the antenna array by the transmit signal, in addition to the control signals. This can further reduce the space required for and/or potential interference from power lines (e.g., wires and connectors) coupled to the antenna array.

Aspects of the present disclosure can achieve a number of technical effects and benefits. For instance, modulating a control signal (and/or a plurality of control signals) onto a radiofrequency signal and communicating the combined signal over a single transmission line can allow for a reduction in device space necessary to communicate control signals within a mobile device. Additionally and/or alternatively, this can result in a reduction in overall cost, such as a reduction in the cost of connectors, wiring, etc. For instance, the transmission line(s) can be configured to transmit most or all of the signals required for operation of any of an antenna array without requiring additional space and/or wiring (e.g., to accommodate additional control signal lines) for some or all of the signals necessary to operate the antenna array. This can allow for, for instance, reduced interference between transmission lines and/or other components of the mobile device.

According to example aspects of the present disclosure, an antenna system can include an antenna array including a plurality of antenna elements. The antenna system can include an array controller that is configured to control the antenna array. For instance, the array controller can be configured to control operation of the antenna array to operate the antenna array for radiofrequency communications, such as beam forming. For example, the antenna array can control a phase (e.g., a phase shift) and/or an amplitude of some or all of the plurality of antenna elements to beam form at the antenna array. In some embodiments, the radiofrequency communications can be 5G communications (e.g., within a frequency band of about 24 GHz to about 86 GHz).

As another example, in some embodiments, the radiofrequency communications can be and/or include MIMO communications (e.g., 5G MIMO communications). For instance, an antenna array can provide one or more additional antenna elements to support MIMO communications (e.g., with and/or from one or more additional antenna arrays, such as a second, third, fourth, etc. antenna array). As one example, a second array controller can be configured to provide one or more additional antenna elements of a second antenna array to operate the second antenna array in a MIMO configuration with a first antenna array.

The antenna system can include a radiofrequency (RF) circuit. Additionally, the antenna system can include a transmission line coupling the radiofrequency circuit to the array controller. For example, the transmission line can be configured to carry a radiofrequency signal for communication via the antenna array.

In some embodiments, the transmission line may be a single coaxial cable. The radiofrequency circuit may be configured to modulate an antenna array control signal (e.g., from a control circuit) onto a radiofrequency signal to generate a transmit signal for communication over the transmission line to the array controller. For instance, in some embodiments, the radiofrequency circuit can perform amplitude-shift keying modulation to modulate the antenna array control signal onto the radiofrequency signal. In some embodiments, the amplitude-shift keying modulation may include on-off keying modulation. In some embodiments, the transmit signal can further include DC power for the antenna array controller. For example, the transmit signal can provide sufficient power to operate the antenna array controller.

The transmit signal can be transmitted over the transmission line to the array controller. The array controller can be configured to demodulate the antenna array control signal such that the array controller can control operation of the one or more antenna arrays via the antenna array control signal. For example, the antenna array control signal can specify a phase shift and/or an amplitude for some or all (e.g., each) of the plurality of antenna elements of an antenna array. The array controller can be configured to implement the phase shift(s) and the amplitude(s) at each of the plurality of antenna elements to control the antenna array. For example, the phase shift(s) and amplitudes can be implemented to provide beam forming at the antenna array.

Additionally and/or alternatively, in some embodiments, the antenna array controller can be a multi-stage antenna array controller including a plurality of independent controllers. For instance, in some embodiments, the transmit signal can be received and/or decoded by a first antenna array controller and forwarded to a second antenna array controller. In some embodiments, the first antenna array controller and the second antenna array controller can be proximate (e.g., located on the same circuit board and/or adjacent circuit boards, and/or otherwise be adjacent elements).

Additionally and/or alternatively, in some embodiments, one or more parasitic elements can be disposed proximate the antenna array(s). The parasitic elements can be tuned to provide beam steering at the antenna array(s). "Beam steering" refers to dynamically steering an antenna beam such that the direction of high gain of the antenna beam is pointed in a particular direction (e.g., the direction of a base station). For instance, a tuning circuit can tune (e.g., vary a reactance at) a parasitic element to steer a radiation pattern from the antenna array(s). Parasitic element control signals implemented at the tuning circuit for beam steering can additionally be transmitted via the transmission lines (e.g., from the control circuit to the tuning circuit). As one example, the parasitic element control signals can additionally be modulated (e.g., by the radiofrequency circuit) onto the transmit signal (e.g., by amplitude-shift keying modulation).

For instance, an antenna system can include a tuning circuit coupled to a parasitic element. The parasitic element can be disposed proximate to an antenna array. The radiofrequency circuit can be configured to modulate a parasitic element control signal onto the radiofrequency signal (e.g., in addition to the antenna array control signal) to generate the transmit signal for communication over the transmission line to the tuning circuit. The tuning circuit can be configured to demodulate the parasitic element control signal from the transmit signal and control operation of the parasitic element for beam steering based on the parasitic element control signal.

Employing amplitude-shift keying modulation as described herein may provide several benefits. For example, the radiofrequency signal and/or control signal(s) (e.g., antenna array control signal) may be transmitted (as components of the transmit single) via a single transmission line with low interference and/or noise. For instance, amplitude-shift keying may produce reduced resonations at harmonic frequencies associated with the control signal(s) and/or radiofrequency signal. This may reduce the noise associated with modulating the control signal(s) onto the radiofrequency signal and demodulating the control signal(s). The resulting high fidelity transmission of the control signal(s) may provide accurate and efficient control over the operation of the antenna array(s).

In some embodiments, the radiofrequency circuit may be configured to modulate the control signal(s) onto the radiofrequency signal by selectively varying an amplitude associated with a carrier signal. In some embodiments, the radiofrequency circuit may be configured to selectively vary the amplitude between about zero and a non-zero value. In some embodiments, the carrier frequency signal may include a repeating pattern. For example, the carrier frequency signal may include a sinusoidal wave having a generally constant frequency.

In some embodiments, the radiofrequency signals may be defined within a first frequency band, and the control signal(s) may be defined within a second frequency band that is distinct from the first frequency band. For example, the first frequency band may range from about 24 GHz to about 86 GHz. As another example, the second frequency band may range ranges from about 10 MHz to about 1 GHz.

In some embodiments, the antenna system may include a first circuit board and a second circuit board that is physically separated from the first circuit board. The radio frequency circuit can be disposed on the first circuit board, and at least one of the array controller, tuning circuit or antenna array can be disposed on the second circuit board.

In some embodiments, the radiofrequency circuit may include a control circuit configured to generate the control signal(s). Additionally and/or alternatively, the radiofrequency circuit can include a modulator circuit configured to modulate the control signal(s) onto a radiofrequency signal (e.g., using amplitude-shift keying modulation) to generate the transmit signal.

Additionally and/or alternatively, in some embodiments, configuration of the plurality of antenna arrays can support MIMO communications. For example, one or more antenna elements of the main antenna array can be switched from being used to support MIMO and/or diversity to being used for beam steering or beam forming. In addition, and/or in the alternative, one or more additional antenna elements from different antenna arrays can be switched from being used to support MIMO and/or diversity to being used for beam steering or beam forming. In some embodiments, each of the antenna arrays can be configured for unique operation (e.g., with a unique receiver). For instance, phase and/or amplitude of each of a plurality of antenna elements in an antenna array can be configured for beam forming and/or beam steering (e.g., to establish a radiation pattern). In some embodiments, one of the antenna arrays (e.g., a main antenna array) can be used for main communications via a communication protocol (e.g., a cellular communication protocol such as 3G, 4G (LTE), 5G protocol), and one or more different antenna arrays can be used to provide a secondary function to support communication of the main antenna array. For instance, the different antenna array(s) can be used to further enhance MIMO and/or diversity operation of the main antenna array.

Another example embodiment of the present disclosure is directed to a method for controlling an antenna array. The method may include modulating, at a radiofrequency circuit, control signal(s) (e.g., an antenna array control signal) onto a radiofrequency signal using amplitude-shift keying modulation to create a transmit signal. The method may include communicating the transmit signal to an array controller via a single coaxial transmission line. The method may include demodulating, at the array controller, the transmit signals to extract the control signal(s) from the radiofrequency signal. The method may include controlling, from the radiofrequency circuit, a configuration of the antenna array (e.g., a plurality of antenna elements of the antenna array) via the control signal(s) and array controller to operate the antenna array for radiofrequency communications (e.g., beam forming). For example, the radiofrequency communications can be 5G communications, MIMO communications, etc. As one example, a phase shift and/or amplitude of one or more antenna elements in the antenna array can be controlled to beam form at the antenna array.

In some embodiments, modulating the control signal(s) onto the radiofrequency signal using amplitude-shift keying modulation at the radiofrequency circuit can include modulating the radiofrequency signal using on-off keying modulation.

In some embodiments, modulating the control signal(s) onto the radiofrequency signal can include selectively varying an amplitude associated with a carrier signal. In some embodiments, selectively varying the amplitude associated with the carrier signal may include varying the amplitude between about zero and a non-zero value. In some embodiments, the carrier signal may include at least one of a sinusoidal wave having a generally constant frequency or any repeating pattern.

As used herein, a "mobile device" is an electronic device capable of communicating wirelessly and capable of being carried by hand of a user while in normal operation. Example mobile devices include smartphones, tablets, laptops, wearable devices, personal digital assistants, and portable digital music players. As used herein, the use of the term "about" in conjunction with a numerical value refers to within 10% of the stated numerical value.

FIG. 1 depicts an example mobile device 100 supporting cellular communication and/or other wireless communication and having beam steering or beam forming capabilities according to example embodiments of the present disclosure. As shown, the mobile device includes a housing 104. The housing 104 can include a plurality of different surfaces (e.g., edge surfaces).

The housing 104, as illustrated, accommodates four antenna arrays: a first antenna array 110, a second antenna array 120, a third antenna array 130, and a fourth antenna array 140. Three antenna arrays are illustrated for purposes of illustration and discussion. Those of ordinary skill in the art, using the disclosures provided herein, will understand that more or fewer antenna arrays can be used without deviating from the scope of the present disclosure.

Each of the first antenna array 110, second antenna array 120, third antenna array 130, and fourth antenna array 140 can include a plurality of antenna elements. Each antenna element can be configured to communicate one or more signals via a cellular communication protocol, such as a 5G communication protocol. Each antenna element can be configured to communicate one or more signals in a frequency band (e.g., in the range of about 24 GHz to about 86 GHz). In some embodiments, each antenna array 110, 120, 130, 140 can include a plurality of antenna elements (e.g., radiating elements) disposed on a substrate (e.g., a circuit board).

The mobile device 100 can include central circuit 150. For instance, central circuit 150 can include a baseband processor (e.g., a host CPU), a radiofrequency circuit, a modulator circuit, a control circuit, and/or any other suitable elements. Although central circuit 150 is depicted as being near the center of the mobile device 100 in FIG. 1, the central circuit can be positioned in any suitable location within the mobile device 100.

The central circuit 150 can be physically separated from the antenna arrays 110, 120, 130, 140. For instance, each of the first antenna array 110, second antenna array 120, third antenna array 130, and fourth antenna array 140 can be coupled to central circuit 150 by one or more transmission lines 105. For instance, in some embodiments, transmission lines 105 can be coaxial cables. For instance, the coaxial cables can be configured to transmit most or all of the signals required for operation of any of the antenna arrays 110, 120, 130, 140, without requiring additional space for communication (e.g., compared to some transmission lines). According to example aspects of the present disclosure, signals from the central circuit 150 can be communicated to the antenna arrays 110, 120, 130, 140 by modulating control signal(s) (e.g., antenna array control signals) onto a radiofrequency signal to form a transmit signal and communicating the transmit signal over the transmission lines 105 (e.g., over a single coaxial cable). An array controller can then demodulate the control signal(s) to operate the antenna arrays 110, 120, 130, 140.

Figure 2:
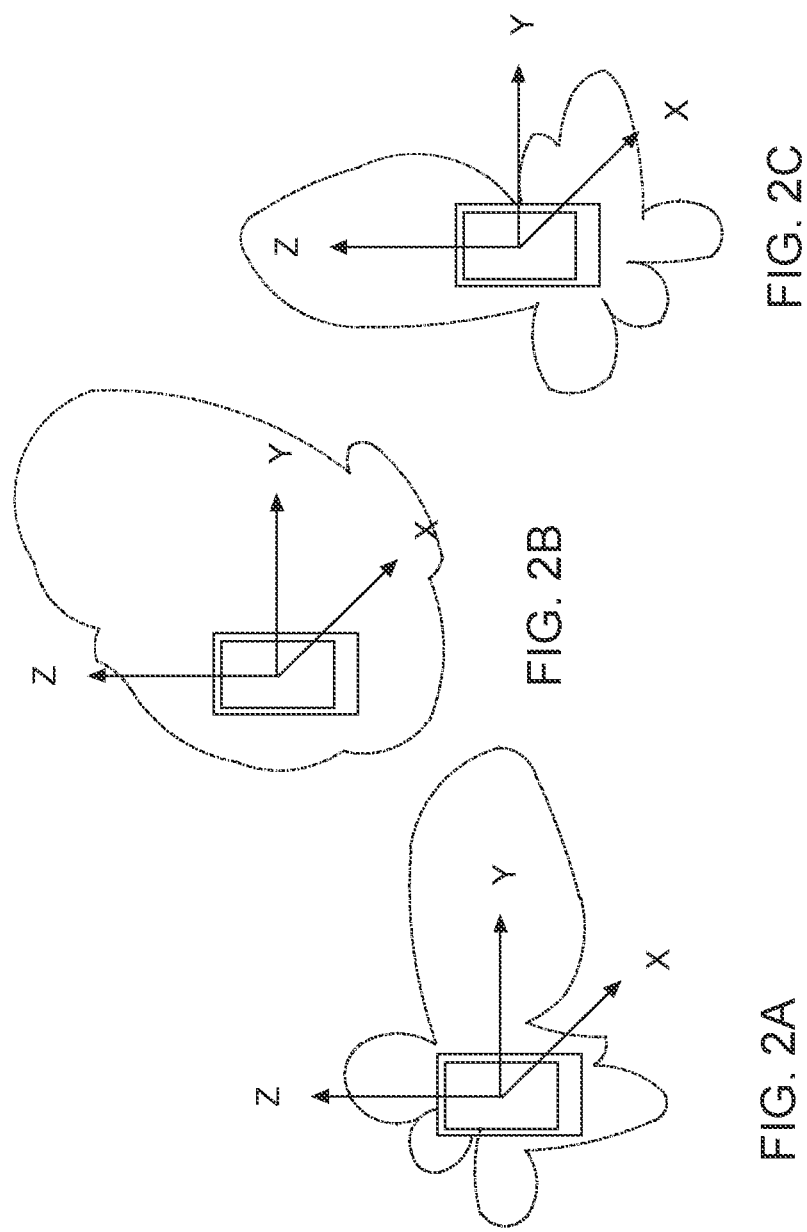
FIGS. 2A, 2B and 2C depict an example beam forming configuration according to example embodiments of the present disclosure.

FIGS. 2A-2C illustrate examples of three different radiation patterns corresponding to three different phase shifts. In this example, the mobile device is configured to include a first antenna array or one or more first antenna elements of a first antenna array that generates a first radiation pattern having the highest gain in the Y direction, and a second antenna array or one or more second antenna elements of a second antenna array that generates a second radiation pattern having the highest gain in the Z direction. FIG. 2A illustrates a first mode in which the time delay, or the phase shift, is set so that the contribution from the second radiation pattern is almost negligible, resulting in a combined radiation pattern having the highest gain in the Y direction. FIG. 2B illustrates a second mode in which the time delay, or the phase shift, is set so that the first and second radiation patterns coexist in phase, resulting in a combined radiation pattern having the highest gain in the Y+Z direction. FIG. 2C illustrates a third mode in which the time delay, or the phase shift, is set so that the contribution from the first radiation pattern is almost negligible, resulting in a combined radiation pattern having the highest gain in the Z direction.

Figure 3:
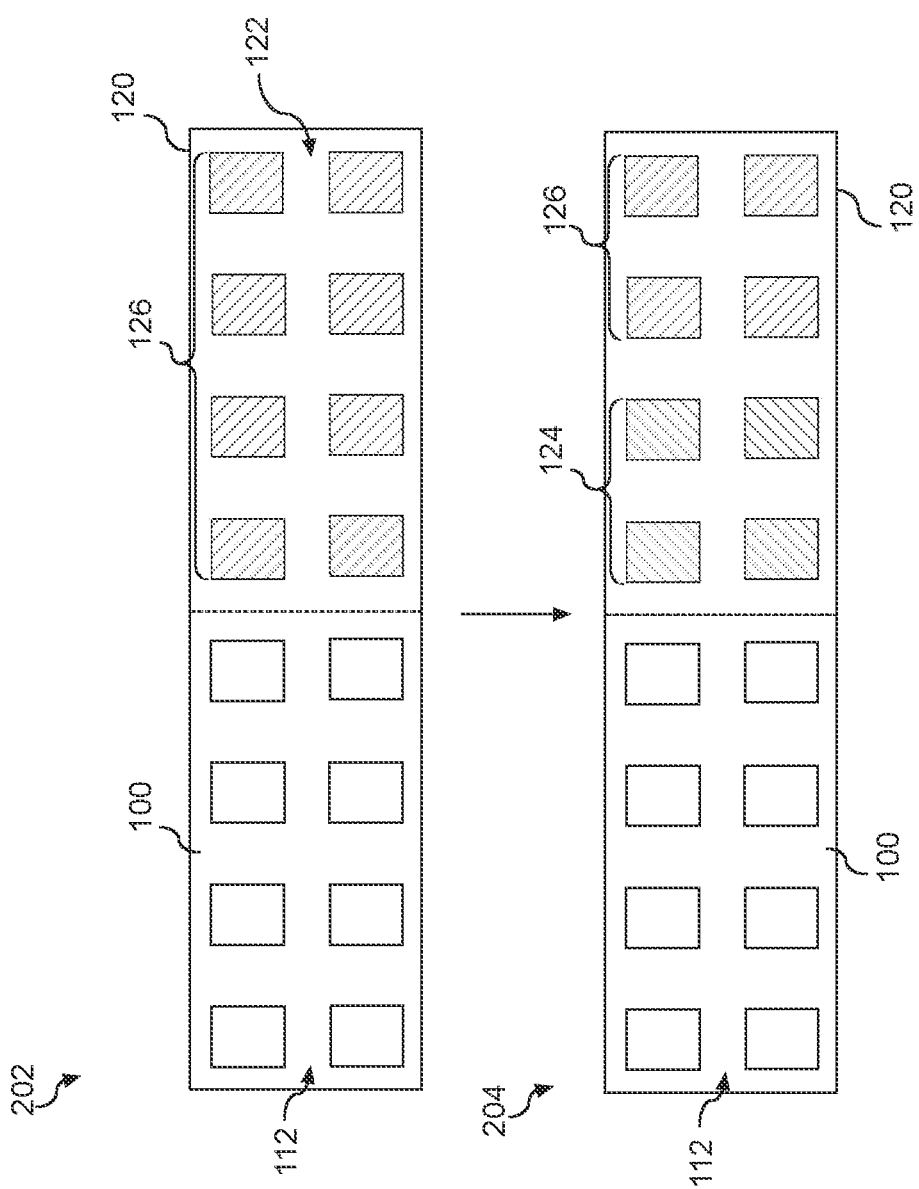
FIG. 3 depicts configuration of antenna array(s) in an antenna system according to example embodiments of the present disclosure.

FIG. 3 depicts an example configuration of the first antenna array 110 and second antenna array 120 in MIMO operation according to example embodiments of the present disclosure. As used herein, a configuration of one or more antenna arrays can include specification of a phase and/or amplitude (e.g., phase shifts and/or amplitude shifts) associated with one or more antenna elements (e.g., each of the antenna elements) of the one or more antenna arrays. Additionally and/or alternatively, a configuration of an antenna array can include specification of some or all antenna elements of a second antenna array operating in a MIMO configuration with a first antenna array. For instance, in configuration 202, a plurality of first antenna elements 112 are configured to support main communication via a communication protocol (e.g., a 5G communication protocol). The plurality of first antenna elements 112 can be communicated via a communication protocol in a MIMO mode. For instance, the plurality of first antenna elements 112 can be configured for operation in a 4×4 MIMO mode.

In configuration 202, a plurality of second antenna elements 122 associated with a second antenna array 120 are configured to provide a secondary function to support the main communication of the first antenna elements 112 in the first antenna array 110. For instance, the plurality of second antenna elements 122 of the second antenna array 120 can provide additional MIMO capability and/or diversity for the first antenna elements 112 in the first antenna array 110.

In this configuration 202, a first subset 126 of the second antenna elements 122 are configured to provide the secondary function to support the first antenna elements 112 of the first antenna array 110. The first subset 126 includes all of the second antenna elements 122 in the second antenna array 120. A second subset (no antenna elements) of the second antenna array 120 are configured to support beam steering or beam forming of the first antenna elements 112 of the first antenna array 110.

According to example aspects of the present disclosure, a control circuit can adjust the configuration of the first antenna array 110 and the second antenna array 120 from configuration 202 to configuration 204. In configuration 204, a subset 124 of the second antenna elements 122 have been configured to support beam steering or beam forming of the first antenna elements 112 of the first antenna array 110. Subset 126 of second antenna elements 122 remain configured to support the secondary function (e.g., MIMO, diversity) of the first antenna elements 112 of the first antenna array 110.

The example of FIG. 3 discusses the configuration of antenna elements across two antenna arrays for purposes of illustration and discussion. Those of ordinary skill in the art, using the disclosures provided herein, will understand that the antennal elements can be associated with a single antenna array or more than two antenna arrays without deviating from the scope of the present disclosure. For example, the antenna elements 112 and 122 can be all part of a single antenna array without deviating from the scope of the present disclosure. As another example, antenna elements across first antenna array 110, second antenna array 120, third antenna array 130, and/or fourth antenna array 140 can be each be used (e.g., alone and/or in combination) without deviating from the scope of the present disclosure.

In some embodiments, the mechanism for configuring antenna elements for beam forming or beam steering in this example can be implemented, for instance, by introducing phase shifts and/or amplitude shifts in signals communicated to the antenna elements. In some implementations, the phase shifts and/or amplitude shifts can be implemented using delay lines that introduce a time delay in signals communicated using the delay line. In some embodiments, the phase shifts can be implemented using a phase shifter. As one example, the phase shifts and/or amplitude can be implemented at an array controller.

Figure 4:
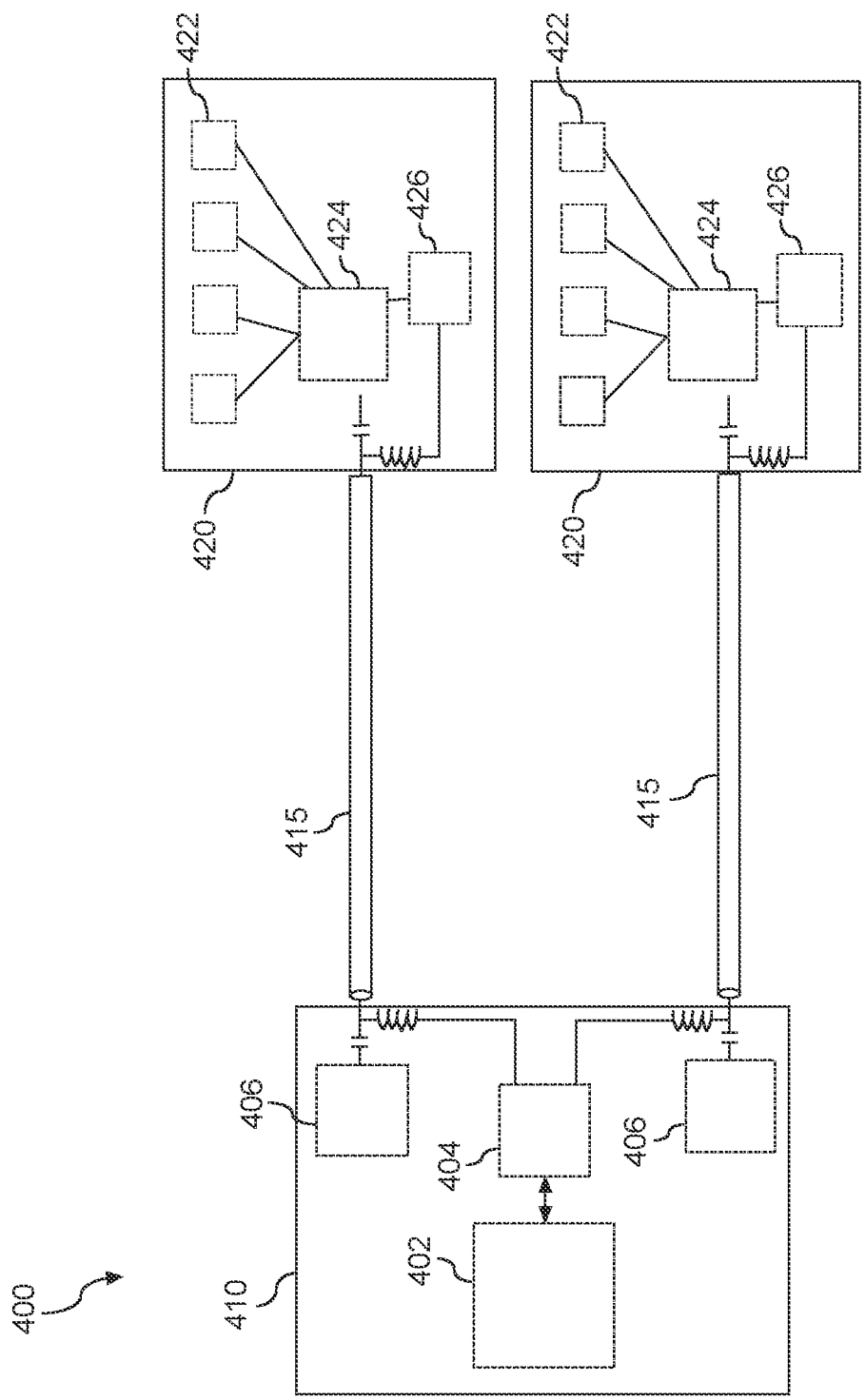
FIG. 4 depicts an example antenna system according to example embodiments of the present disclosure.

FIG. 4 illustrates an example antenna system 400 according to example aspects of the present disclosure. Antenna system 400 can include radiofrequency circuit 410 and two antenna arrays 420. It should be understood that two antenna arrays 420 are illustrated for the purposes of illustration, and more or fewer antenna arrays 420 can be used in accordance with aspects of the present disclosure. For instance, in some embodiments, four antenna arrays 420 can be used. In some embodiments, each of radiofrequency circuit 410 and antenna array(s) 420 can be disposed on separate circuit boards. For instance, radiofrequency circuit 410 and its components can be disposed on a first circuit board and a first antenna array 420 and its components (e.g., antenna elements 422, front end module 424, array controller 426) can be disposed on a second circuit board. Additional antenna arrays 420 can be disposed on additional circuit boards. As one example, antenna system 400 can include a first circuit board and a second circuit board that is physically separate from the first circuit board. The modulator circuits 406 can be disposed on the first circuit board, and at least one of the array controller 426 or antenna array (e.g., plurality of antenna elements 422) can be disposed on the second circuit board.

The radiofrequency circuit 410 can be coupled to the antenna arrays 420 by transmission lines 415. For instance, transmission lines 415 can be coaxial cables (e.g., each transmission line 415 can be a single coaxial cable) configured to transmit a transmit signal that includes control signal(s) for the antenna arrays 420 and/or a radiofrequency signal.

The radiofrequency circuit 410 can include host CPU 402. Host CPU 402 can be configured to perform operations that include steps of receiving and/or transmitting signals by antenna system 400. As one example, host CPU 402 can be a central processor of a mobile device housing antenna system 400. For example, host CPU 402 can be a central processor of a cell phone and/or smartphone.

The radiofrequency circuit 410 can include control circuit 404. Control circuit 404 can be configured to process signals from host CPU 402 at a frequency native to the signals (e.g., a baseband frequency). For instance, the control circuit 404 can be operable to prepare signals for transmission to and/or from the host CPU 402. In some embodiments, the host CPU 402 and control circuit 404 can be coupled by signal traces (e.g., on a circuit board, such as a printed circuit board).

The radiofrequency circuit 410 can include modulator circuit 406. Modulator circuit 406 can be configured to modulate an antenna array control signal (e.g., from control circuit 404) onto a radiofrequency signal to generate a transmit signal for communication over the transmission line 415. For instance, the transmit signal can be communicated over the transmission line 415 to antenna array 420, such as front end module 424 and/or array controller 426.

Antenna array 420 can include a plurality of antenna elements 422. The plurality of antenna elements 422 can be configurable as discussed with reference to FIG. 2. For instance, a configuration of the plurality of antenna elements 422 can be adjusted to operate the antenna array 420 for radiofrequency communications (e.g., 5G communications, MIMO communications).

Antenna array 420 can include front end module 424. Front end module 424 can be configured to process signals before transmission to the plurality of antenna elements 422 and/or after reception from the plurality of antenna elements 422. For instance, the front end module 424 can be configured to upsample and/or downsample signals, perform phase shifting, envelope tracking, and/or any other suitable functionality of a front end module. As illustrated in FIG. 4, the front end module 424 can be disposed proximate the antenna array 420 (e.g., on a same circuit board as antenna array 420). In some embodiments, however, the front end module 424 can be positioned proximate the radiofrequency circuit 410 (e.g., on a same circuit board as radiofrequency circuit 410). In some embodiments, a portion of front end module 424 can be distributed between both the radiofrequency circuit 410 and/or antenna arrays 420. This is further discussed below with respect to FIGS. 5-6.

Antenna array 420 can include array controller 426. Array controller 426 can be configured to demodulate an antenna array control signal from a transmit signal (e.g., from modulator circuit 406 and over transmission line 415) such that the array controller 426 can control operation of the antenna array 420 (e.g., the plurality of antenna elements 422) via the antenna array control signal. As one example, the array controller 426 can configure a phase shift and/or an amplitude of some or all of the plurality of antenna elements 422. As another example, in some embodiments, the array controller 426 can configure the plurality of antenna elements 422 to act as additional antenna elements for MIMO communications in tandem with a plurality of array elements 422 of an additional antenna array 420.

Figure 5:
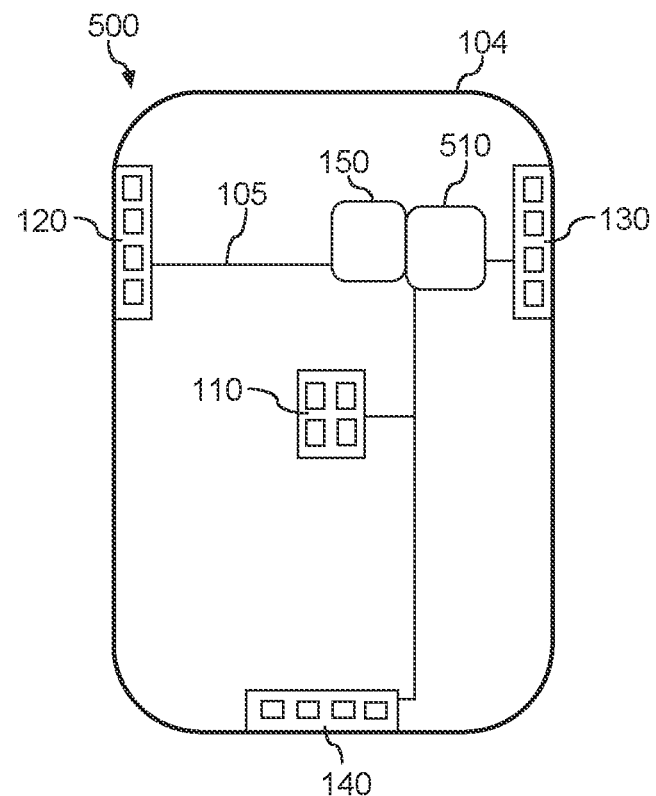
FIG. 5 depicts a mobile device having an antenna system with a centralized front end module configuration according to example embodiments of the present disclosure.

FIG. 5 depicts a mobile device 500 having an antenna system with a centralized front end module configuration according to example embodiments of the present disclosure. Mobile device 500 can include a centralized front end module 510. As illustrated in FIG. 5, the centralized front end module 510 can be disposed proximate the central circuit 150. For instance, the centralized front end module can be disposed on a same circuit board as the central circuit 150. The centralized front end module can be configured to perform front end processing for some or all of the antenna arrays 110, 120, 130, 140.

Figure 6:
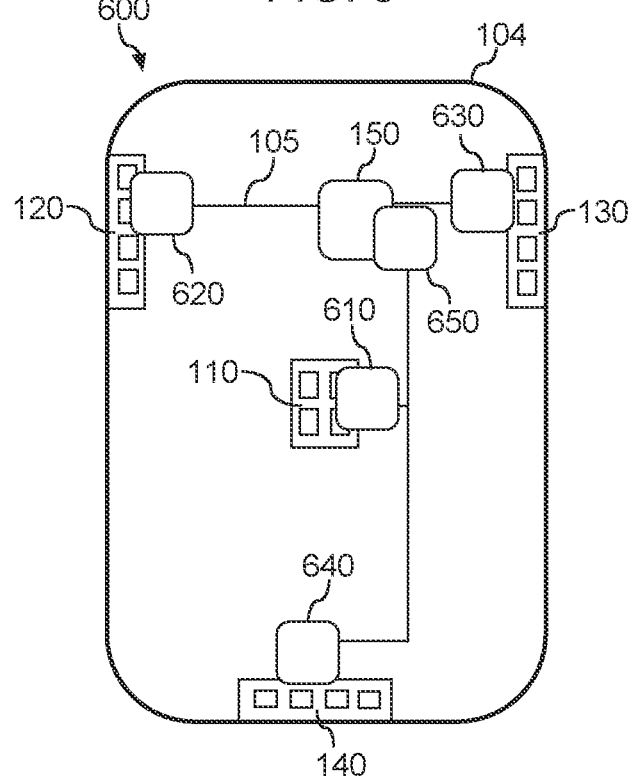
FIG. 6 depicts a mobile device having an antenna system with a distributed front end module configuration according to example embodiments of the present disclosure.

FIG. 6 depicts a mobile device 600 having an antenna system with a distributed front end module configuration according to example embodiments of the present disclosure. As illustrated in FIG. 6, a front end system can include a central portion of the front end module system (e.g., a central front end module) 650 and a plurality of antenna proximate portions of the front end module system (e.g., antenna proximate front end modules) 610, 620, 630, 640. For instance, the central front end module 650 can be disposed proximate the central circuit 150. As one example, the central front end module 650 can be disposed on a same circuit board as the central circuit 150. The central front end module 650 can be configured to perform at least a portion of front end processing of a signal prior to transmission of the signal by transmission lines 105. For instance, the central front end module 650 can perform front end processing common to each of the antenna arrays 110, 120, 130, 140. Additionally and/or alternatively, the antenna proximate front end modules 610, 620, 630, 640 can perform front end processing uniquely for each of the antenna arrays 110, 120, 130, 140. In some embodiments, the antenna proximate front end modules 610, 620, 630, 640 can be disposed on a same circuit board as a respective antenna array 110, 120, 130, 140. For instance, the central front end module 650 can be in signal communications with each of the antenna proximate front end modules 610, 620, 630, 640 via transmission lines 105.

Figure 7:
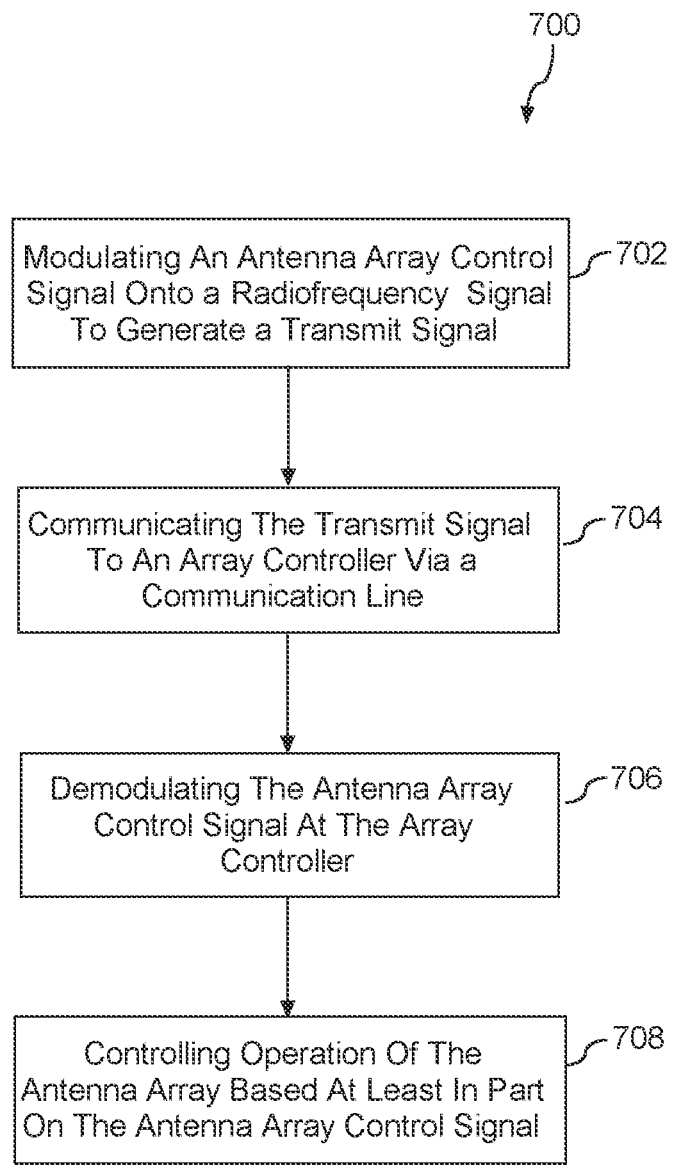
FIG. 7 depicts a flow diagram of an example method according to example embodiments of the present disclosure.

FIG. 7 depicts a flow diagram of an example method 700 for operating an antenna array according to example embodiments of the present disclosure. FIG. 7 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 700 is generally discussed with reference to the computing devices and/or antenna systems 100-600 described above with reference to FIGS. 1-6. However, it should be understood that aspects of the present method 700 may find application with any suitable antenna system including an antenna array.

The method 700 can include, at (702), modulating, at a radiofrequency circuit, an antenna array control signal onto a radiofrequency signal to generate a transmit signal. For example, the antenna array control signal can be modulated onto a radiofrequency signal using amplitude-shift keying modulation to generate a transmit signal. For example, the antenna array control signal may contain control instructions for changing the configuration of the antenna array (e.g., of a plurality of antenna elements) or otherwise adjusting the orientation or frequency of the radiation pattern of the antenna array. For example, a radiofrequency circuit may include a control circuit that is configured to modulate the antenna array control signal onto the radiofrequency signal using amplitude-shift keying modulation to generate a transmit signal, such as described above with reference to FIGS. 1-6. In some embodiments, modulating the control signal onto the radiofrequency signal using amplitude-shift keying modulation at the radiofrequency circuit may include modulating the radiofrequency signal using on-off keying modulation. In some embodiments, modulating the control signal onto the radiofrequency signal may include selectively varying an amplitude associated with a carrier signal. In some embodiments, the selectively varying the amplitude associated with the carrier signal may include varying the amplitude between about zero and a non-zero value. In some embodiments, the carrier signal may include a sinusoidal wave. The sinusoidal wave may have a generally constant frequency, or, in some embodiments, may include any suitable repeating pattern.

The method 700 can include, at (704), communicating the transmit signal to an array controller via a transmission line. The transmission line can be a single coaxial transmission line. For example, as described above with reference to FIGS. 1-6, a radiofrequency circuit may include a front end module that may communicate the radiofrequency signal through a transmission line to an array controller.

The method 700 may include, at (706), demodulating the antenna array control signal at the array controller. For example, as described above with reference to FIG. 4, an array controller may be configured to de-modulate the antenna array control signal from the transmit signal. The array controller may also be configured to filter and/or amplify the control signal to isolate or relatively increase the strength of a carrier signal frequency associated with a carrier signal. A logic circuit (e.g., included in the array controller) may be configured to interpret control instructions associated with (e.g., contained in) the antenna array control signal.

The method 700 may include, at (708), controlling operation of the antenna array based at least in part on the antenna array control signal. For instance, an array controller can be configured to control operation of the antenna array to operate the antenna array for radiofrequency communications. As one example, the radiofrequency communications can be 5G communications. As another example, the radiofrequency communications can be MIMO communications (e.g., 5G MIMO communications). As one example, a phase shift and/or amplitude of each of a plurality of antenna elements in the antenna array can be implemented by the array controller.

As another example, in some embodiments, an antenna array can provide one or more additional antenna elements to support MIMO communications (e.g., with and/or from one or more additional antenna arrays, such as a second, third, fourth, etc. antenna array). As one example, a second array controller can be configured to provide one or more additional antenna elements of a second antenna array to operate the second antenna array in a MIMO configuration with a first antenna array.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system, comprising:
    plurality of antenna arrays, each of the plurality of antenna arrays comprising a plurality of antenna elements;
    plurality of array controllers coupled to each of the plurality of antenna arrays, each of the plurality of array controllers configured to control operation of each of the plurality of antenna arrays for beam forming of each of the plurality of antenna arrays;
    a radiofrequency circuit;
    a central front-end module disposed proximate to the radiofrequency circuit, the central front-end module configured to perform front-end signal processing operations common to the plurality of antenna arrays;
    a plurality of proximate front-end modules, each of the plurality of proximate front-end modules disposed proximate to and coupled to an antenna array of the plurality of antenna arrays, each of the proximate front-end modules configured to perform front-end signal processing operations unique to the respective antenna array; and
    a transmission line coupling the radiofrequency circuit to each of the plurality of array controllers, the transmission line configured to carry a radiofrequency signal for communication via each of the plurality of antenna arrays;
    wherein:
        the radiofrequency circuit is configured to modulate an antenna array control signal onto the radiofrequency signal to generate a transmit signal for communication over the transmission line to each of the plurality of array controllers; and
        each of the plurality of array controllers is configured to demodulate the antenna array control signal from the transmit signal such that each of the plurality of array controllers is configured to control operation of the antenna array coupled thereto based at least in part on the antenna array control signal.

2. The antenna system of claim 1, wherein the antenna array control signal specifies a phase shift for one or more of the plurality of antenna elements, and wherein each of the plurality of array controllers are configured to implement the phase shift at the one or more of the plurality of antenna elements.

3. The antenna system of claim 1, wherein the antenna array control signal specifies an amplitude for one or more of the plurality of antenna elements, and wherein each of the plurality of array controllers are configured to implement the amplitude at the one or more of the plurality of antenna elements.

4. The antenna system of claim 1, wherein the plurality of antenna arrays comprises a first antenna array, the antenna system further comprising:
    a second antenna array of the plurality of antenna arrays coupled to a second array controller of the plurality of array controllers, wherein the second array controller is configured to control operation of the second antenna array to operate the second antenna array to support multiple input multiple output (MIMO) communication with the first antenna array, wherein a second transmission line is coupled to the second array controller.

5. The antenna system of claim 1, wherein the radiofrequency circuit is configured to modulate the antenna array control signal onto the radiofrequency signal by amplitude-shift keying modulation.

6. The antenna system of claim 1, wherein the transmission line is a single coaxial cable.

7. The antenna system of claim 1, further comprising a tuning circuit coupled to a parasitic element, the parasitic element disposed proximate to an antenna array of the plurality of antenna arrays, wherein:
    the radiofrequency circuit is configured to modulate a parasitic element control signal onto the radiofrequency signal to generate the transmit signal for communication over the transmission line to the tuning circuit; and
    the tuning circuit is configured to demodulate the parasitic element control signal from the transmit signal and control operation of the parasitic element for beam steering based on the parasitic element control signal.

8. The antenna system of claim 1, wherein the radiofrequency signal is in a frequency band of about 24 GHz to about 86 GHz.

9. The antenna system of claim 1, wherein the radiofrequency circuit is physically separated from at least one of the plurality of array controllers or the plurality of antenna arrays.

10. The antenna system of claim 1, wherein the antenna system is disposed in a mobile device.

11. The antenna system of claim 1, wherein the transmit signal further comprises DC power for the antenna array controller.

12. A method for operating an antenna system comprising a plurality of antenna arrays, the method comprising:
    modulating an antenna array control signal onto a radiofrequency signal to generate a transmit signal;
    communicating, via a central front-end module of a radiofrequency circuit, the transmit signal to an array controller of a plurality of array controllers via a transmission line, each of the plurality of array controllers coupled to each of the plurality of antenna arrays;
    demodulating the antenna array control signal at the array controller of the plurality of array controllers; and
    controlling operation of an antenna array of the plurality of antenna arrays based at least in part on the antenna array control signal.

13. The method of claim 12, wherein the transmission line is a single coaxial transmission line.

14. The method of claim 12, wherein the antenna array control signal is modulated onto the radiofrequency signal using amplitude-shift keying modulation to generate the transmit signal.

15. The method of claim 14, wherein the antenna array control signal is modulated onto the radiofrequency signal using on-off keying modulation to generate the transmit signal.

16. The method of claim 12, wherein modulating the control signal onto the radiofrequency signal comprises selectively varying an amplitude associated with a carrier signal.

17. The method of claim 12, wherein the antenna array control signal specifies an amplitude for one or more of a plurality of antenna elements of each of the plurality of antenna arrays.

18. The method of claim 12, wherein the antenna array control signal specifies a phase shift for one or more of a plurality of antenna elements of each of the plurality of antenna arrays.

* * * * *